(12) United States Patent
Hattori et al.

(10) Patent No.: US 11,981,259 B2
(45) Date of Patent: May 14, 2024

(54) SOUND GENERATION DEVICE FOR VEHICLE

(71) Applicant: Mazda Motor Corporation, Hiroshima (JP)

(72) Inventors: Yukifusa Hattori, Aki-gun (JP); Seisuke Mitsunaga, Aki-gun (JP); Hidekazu Shiraishi, Aki-gun (JP); Katsuya Shimizu, Aki-gun (JP); Ryuichi Yamada, Aki-gun (JP); Chieko Nakagami, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 193 days.

(21) Appl. No.: 17/636,173

(22) PCT Filed: Aug. 12, 2020

(86) PCT No.: PCT/JP2020/030691
§ 371 (c)(1),
(2) Date: Feb. 17, 2022

(87) PCT Pub. No.: WO2021/033607
PCT Pub. Date: Feb. 25, 2021

(65) Prior Publication Data
US 2022/0297598 A1     Sep. 22, 2022

(30) Foreign Application Priority Data
Aug. 21, 2019  (JP) ................. 2019-150988

(51) Int. Cl.
*H04R 1/00*      (2006.01)
*B60Q 9/00*     (2006.01)
*G10K 15/02*    (2006.01)

(52) U.S. Cl.
CPC ............... *B60Q 9/00* (2013.01); *G10K 15/02* (2013.01); *H04R 2499/13* (2013.01)

(58) Field of Classification Search
CPC ................................................ H04R 2499/13
(Continued)

(56) References Cited

U.S. PATENT DOCUMENTS

| | | | | |
|---|---|---|---|---|
| 2014/0015656 A1* | 1/2014 | Shimizu | ................ | B60Q 5/008 340/425.5 |
| 2014/0085071 A1* | 3/2014 | Tsuzuki | ................ | B60Q 5/008 340/466 |

(Continued)

FOREIGN PATENT DOCUMENTS

| | | |
|---|---|---|
| JP | H07322403 A | 12/1995 |
| JP | 2017062320 A | 3/2017 |

OTHER PUBLICATIONS

Translation of JP-H0553594-A, 1993 (Year: 1993).*
(Continued)

*Primary Examiner* — Katherine A Faley
(74) *Attorney, Agent, or Firm* — Alleman Hall & Tuttle LLP (57) ABSTRACT

A sound generation device for a vehicle, the sound generation device being installed in a vehicle which travels using an electric-powered motor as a power source, includes a sound control apparatus which sets a plurality of frequencies corresponding to a motor rotation speed and generates a synthetic sound signal indicating a synthetic sound including sounds at the plurality of frequencies and a speaker which outputs the synthetic sound based on the synthetic sound signal generated by the sound control apparatus, and the sound control apparatus sets an increase amount of an output of a sound in a low frequency band large compared to an increase amount of an output of a sound in a high (Continued)

frequency band in a frequency range of the synthetic sound in accordance with an increase in a motor torque value.

20 Claims, 8 Drawing Sheets

(58) Field of Classification Search
USPC .......................................................... 381/86
See application file for complete search history.

(56) References Cited

U.S. PATENT DOCUMENTS

2014/0086418 A1* 3/2014 Lubberhuizen ........ H04R 3/007
381/55
2015/0016627 A1 1/2015 Barlow, Jr. et al.

OTHER PUBLICATIONS

European Patent Office, Extended European Search Report Issued in Application No. 20854998.0, dated Jul. 28, 2022, Germany, 7 pages.

* cited by examiner

SOUND GENERATION DEVICE FOR VEHICLE

TECHNICAL FIELD

The present invention relates to a sound generation device for a vehicle, particularly to a sound generation device for a vehicle which outputs a predetermined sound during vehicle traveling.

BACKGROUND ART

In related art, in electric vehicles driven by electric-powered motors (for example, electric motorcycles), a technique has been known which outputs a sound at a predetermined frequency toward a driver in accordance with a motor rotation speed (for example, see Patent Literature 1). An electric vehicle disclosed in Patent Literature 1 is configured such that a sound at a higher frequency is produced as the motor rotation speed is higher. Specifically, in Patent Literature 1, in a lower speed range than a higher speed range of the motor rotation speed, a change rate of the frequency with respect to the motor rotation speed is set larger. Accordingly, in Patent Literature 1, behavior (vehicle speed) of the vehicle is conveyed to a driver by a change in the frequency of the sound provided to the driver.

CITATION LIST

Patent Literature

Patent Literature 1: Japanese Patent Laid-Open No. 2017-62320

SUMMARY OF INVENTION

Technical Problem

However, a technique of Patent Literature 1 does not enable a driver to recognize a change in an electric-powered motor as a power source, specifically, powerfulness (motor torque) of acceleration of a vehicle based on a produced sound. Thus, the technique of Patent Literature 1 has a problem in which the driver is likely to feel a sense discomfort between a sound produced in traveling and an accelerator operation performed by the driver.

The present invention has been made to solve such problems, and an object thereof is to provide a sound generation device for a vehicle which can cause a driver to easily recognize the powerfulness of the acceleration of a vehicle and promote an accurate accelerator operation.

Solution To Problem

To achieve the above object, the present invention provides a sound generation device for a vehicle, the sound generation device being installed in a vehicle which travels using an electric-powered motor as a power source, the sound generation device including a sound controller which sets a plurality of frequencies corresponding to a motor rotation speed of the electric-powered motor and generates a synthetic sound signal indicating a synthetic sound including sounds at the plurality of frequencies, and a sound output unit which outputs the synthetic sound based on the synthetic sound signal generated by the sound controller, wherein the sound controller sets an increase amount of an output of a sound in a low frequency band large compared to an increase amount of an output of a sound in a high frequency band in a frequency range of the synthetic sound in accordance with an increase in a motor torque value of the electric-powered motor.

According to the present invention in such a configuration, when a driver performs an accelerator operation for accelerating the vehicle, an increase amount of a sound pressure level of a sound in a low tone range of the synthetic sound becomes larger than a sound in a high tone range. Thus, in the present invention, when the driver depresses an accelerator, as its feedback, the synthetic sound whose low sound side is reinforced is output from the sound output unit. Furthermore, the synthetic sound whose low sound side is reinforced enables the driver to easily recognize powerfulness of acceleration of the vehicle which corresponds to an accelerator operation, and an accurate accelerator operation by the driver is promoted. Note that a "plurality of frequencies" may be "plurality and a predetermined number of frequencies".

Further, in the present invention, the sound controller preferably makes an increase amount of an output of a sound at at least one specific frequency included in the low frequency band larger than an increase amount of an output of a sound at a frequency included in a high frequency band in accordance with an increase in the motor torque value of the electric-powered motor.

According to the present invention in such a configuration, because in the frequency range of the synthetic sound, the sound at the at least one specific frequency in a relatively low frequency band is increased more largely than a sound in a relatively high frequency band, a sound in a low tone range of the synthetic sound can be reinforced.

Further, in the present invention, the output of the sound at the at least one specific frequency is preferably increased from an output level which is unrecognizable by the driver in the vehicle to an output level which is recognizable by the driver in accordance with an increase in the motor torque value of the electric-powered motor.

According to the present invention in such a configuration, taking into consideration an audible sound pressure level of a human, a sound at a new frequency is substantially added to the low frequency band in accordance with an increase in the motor torque value. Thus, in the present invention, because a sound pressure level in the low frequency band is increased and a sound whose frequency density in the low frequency band is made higher is generated, a sound in a low tone range of the synthetic sound can be reinforced.

Further, in the present invention, the at least one specific frequency preferably has a chord relationship with at least one other frequency among the plurality of frequencies.

According to the present invention in such a configuration, the synthetic sound which is output when the motor torque value is increased has a comparatively high consonance degree and sounds as plural harmonious sounds (a chord) to a human ear. Accordingly, the driver can receive a synthetic sound with little discomfort as feedback in an accelerator operation.

Further, in the present invention, the sound controller preferably sets each frequency of the plurality of frequencies such that each of the frequencies is proportional to the motor rotation speed of the electric-powered motor, and in a case where any frequency among the plurality of frequencies exceeds a predetermined frequency threshold value, the sound controller preferably reduces an output of a sound at the frequency which exceeds the predetermined frequency threshold value.

According to the present invention in such a configuration, the frequencies of the sounds configuring the synthetic sound increase in accordance with an increase in the motor rotation speed, and the driver can thereby recognize acceleration of the vehicle, but a sound at an excessively high frequency sounds harsh to a human ear. Accordingly, in the present invention, the output of the sound at the frequency which exceeds the predetermined frequency threshold value is reduced. That is, as the motor rotation speed is increased, from the highest frequency to a low frequency, outputs of sounds at specific frequencies are reduced in order. In this case, although the output of the sound at the highest frequency is reduced in accordance with an increase in the motor rotation speed, similarly to an illusion due to a Shepard tone, it sounds to the ear of the driver as if all of the frequencies of the synthetic sound continued to increase. Thus, in the present invention, without hearing a harsh high frequency sound, the driver can recognize acceleration of the vehicle by a frequency increase which is sensed by the ear as the motor rotation speed increases.

Further, in the present invention, the plurality of frequencies preferably include at least one dissonant frequency, the dissonant frequency has a dissonance relationship with the other frequencies of the plurality of frequencies, and the sound controller increases an output of a sound at the dissonant frequency when the motor rotation speed of the electric-powered motor exceeds a predetermined rotation speed threshold value.

According to the present invention in such a configuration, the sound at the dissonant frequency has a dissonance relationship with the sounds at the other frequencies of the synthetic sound. Thus, when the output of the sound at the dissonant frequency is increased, a beat between this sound and another sound becomes large. In this case, the driver can perceive discomfort with the synthetic sound (for example, the synthetic sound is not harmonic) by recognizing presence or an increase of the beat. Thus, by this discomfort, the driver can recognize that the vehicle is traveling in a higher motor rotation region than the predetermined rotation speed threshold value. In general, in an electric vehicle, a motor torque becomes low in a high rotation region where the motor rotation speed is high. Thus, by a change in sound quality (beat) of the synthetic sound, the driver can easily recognize that a larger depression amount of the accelerator is needed to obtain further acceleration of the vehicle.

Advantageous Effects of Invention

A sound generation device for a vehicle of the present invention can cause a driver to easily recognize powerfulness of acceleration of a vehicle and promote an accurate accelerator operation.

DESCRIPTION OF EMBODIMENT

An embodiment of the present invention will hereinafter be described with reference to the attached drawings.

Figure 1:
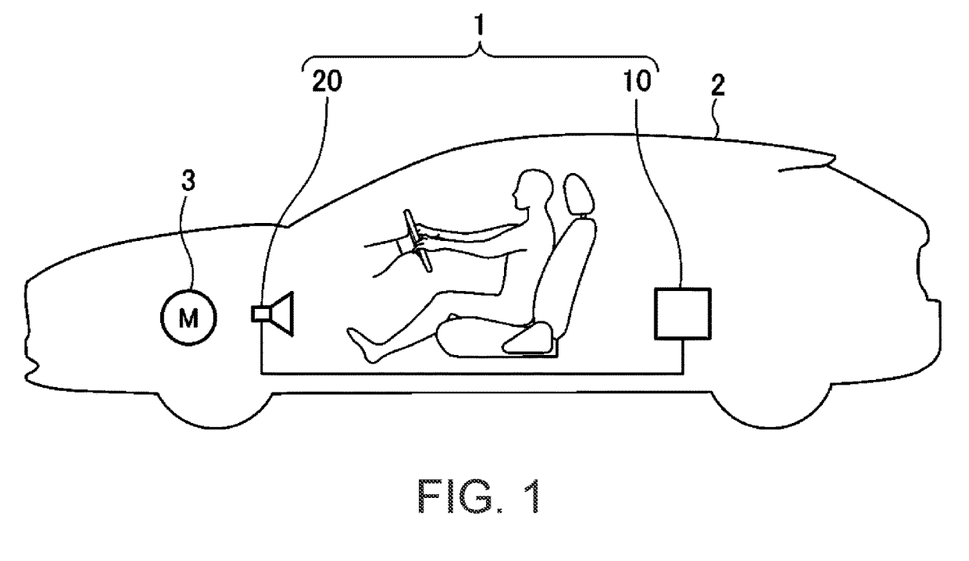
FIG. 1 is an explanatory diagram of a sound generation device for a vehicle of an embodiment of the present invention.

First, a description will be made about a configuration of a sound generation device for a vehicle of the present invention with reference to FIG. 1 and FIG. 2. FIG. 1 is an explanatory diagram of the sound generation device for a vehicle, and FIG. 2 is a configuration diagram of the sound generation device for a vehicle.

Figure 2:
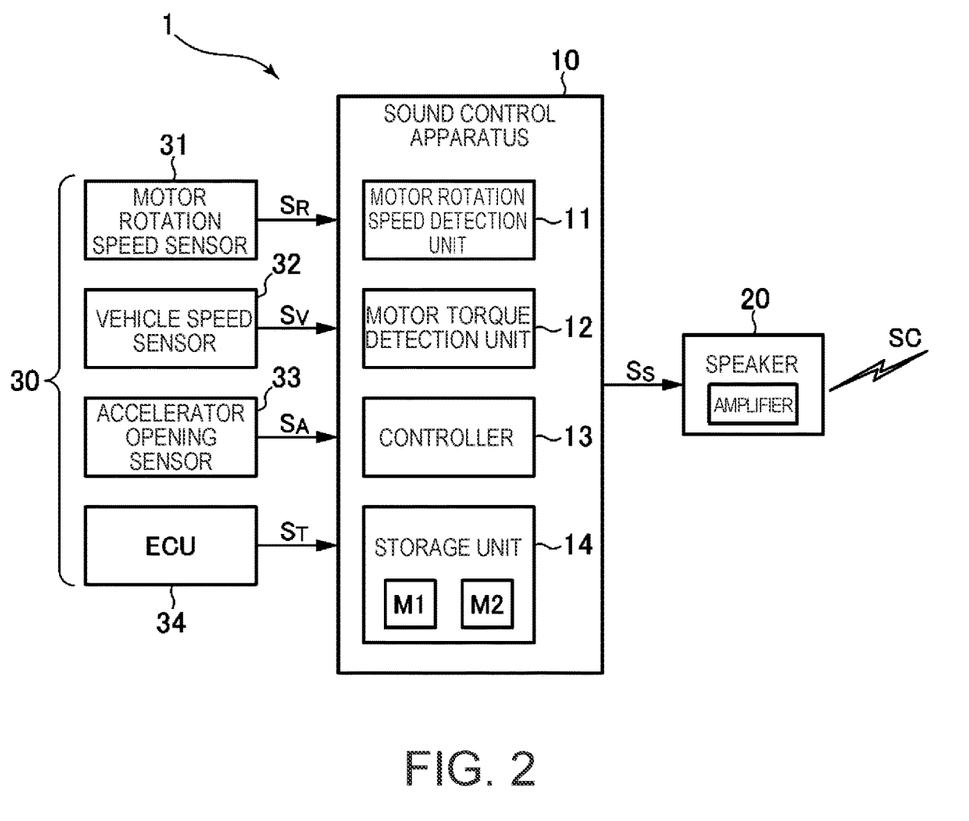
FIG. 2 is a configuration diagram of the sound generation device for a vehicle of the embodiment of the present invention.

As illustrated in FIG. 1 and FIG. 2, a sound generation device 1 for a vehicle of the present embodiment includes a sound control apparatus 10 which is installed in a vehicle 2, a speaker 20 which outputs a predetermined sound to a driver in a vehicle cabin, and a sensor group 30 having various sensors which detect states of the vehicle 2.

The vehicle 2 is an electric vehicle (EV) which includes an electric-powered motor 3 as a driving force. The vehicle 2 does not include an internal combustion engine (such as a gasoline engine) and thus does not produce an engine sound in traveling. The electric-powered motor 3 produces a working sound, but a motor working sound is soft compared to an engine sound. Thus, a driver in the vehicle can hardly recognize the motor working sound. In the present embodiment, in order to enable the driver to understand a working situation of the electric-powered motor 3, the sound generation device 1 for a vehicle is configured to produce a sound corresponding to the working situation of the electric-powered motor 3. Note that in the present embodiment, the vehicle 2 does not include an internal combustion engine; however, the vehicle 2 is not limited to this but may be a hybrid vehicle including both of an internal combustion engine and an electric-powered motor.

The sound control apparatus 10 is a computer device which includes a processor, memory (storage unit 14) which stores various programs, a data input-output device, and so forth. The sound control apparatus 10 is connected with other vehicle-mounted devices via an in-vehicle communication line so as to be capable of communicating with the devices. The sound control apparatus 10 is configured such that the processor executes a program based on vehicle information from the sensor group 30 and the sound control apparatus 10 outputs a sound signal to the speaker 20. In this case, the processor of the sound control apparatus 10 functions as a motor rotation speed detection unit 11, a motor torque detection unit 12, and a controller 13 as described in the following.

The speaker 20 is a sound output unit which includes an amplifier. The speaker 20 receives the sound signal from the sound control apparatus 10, amplifies the sound signal at a predetermined amplification factor, and outputs a sound based on the sound signal. Note that the speaker 20 may not have to be provided in the vehicle cabin, but it is sufficient that the driver can recognize a sound produced by the speaker 20.

The sensor group 30 includes a motor rotation speed sensor 31 which detects a motor rotation speed of the electric-powered motor 3, a vehicle speed sensor 32 which detects a vehicle speed of the vehicle 2, an accelerator opening sensor 33 which detects an accelerator opening, and an electronic control unit (ECU) 34 which controls the electric-powered motor 3. The sensor group 30 of those sensors transmits signals indicating detected vehicle information through the in-vehicle communication line. The sound control apparatus 10 can receive various vehicle information signals from the sensor group 30 via the in-vehicle communication line.

The vehicle information signals include a motor rotation speed signal $S_R$, a vehicle speed signal $S_V$, an accelerator opening signal $S_A$, and a motor torque value signal $S_T$. The sound control apparatus 10 (processor) reads a motor rotation speed R from the motor rotation speed signal $S_R$ as the motor rotation speed detection unit 11 and reads a motor torque value T from the motor torque value signal $S_T$ as the motor torque detection unit 12. The motor torque value T is a requested motor torque value (or a target motor torque value) from the electric-powered motor 3.

The ECU 34 is, similarly to the sound control apparatus 10, a computer device which includes a processor, memory which stores various programs, a data input-output device, and so forth. The ECU 34 receives the vehicle speed signal $S_V$, the accelerator opening signal $S_A$, and other signals via the in-vehicle communication line. The ECU 34 uses an acceleration characteristic map (stored in the memory of the ECU 34) which defines the relationship between the accelerator opening, a shift stage, and so forth (or the accelerator opening, its change rate (a depression speed of an accelerator), the shift stage, and so forth) and a target acceleration and thereby calculates the target acceleration from the present accelerator opening and so forth. In addition, the ECU 34 calculates the requested motor torque value (or target motor torque value) for realizing the target acceleration.

Note that in the present embodiment, the motor torque value T is the requested motor torque value from the electric-powered motor 3; however, the motor torque value T is not limited to this but may be an actual motor torque value which is actually output by the electric-powered motor 3. However, because a sound output can be provided to the driver more quickly, with respect to an accelerator operation by the driver, by using the requested motor torque value than the actual motor torque value, larger contribution to an improvement in operability in driving can be expected. In this point, using the requested motor torque value is preferable compared to the actual motor torque.

Further, in the present embodiment, the sound control apparatus 10 receives the motor torque value T from the ECU 34; however, the motor torque value T is not limited to this, but as describe above, the sound control apparatus 10 may use the acceleration characteristic map or the like and may thereby calculate the motor torque value T from the accelerator opening and so forth.

Figure 3:
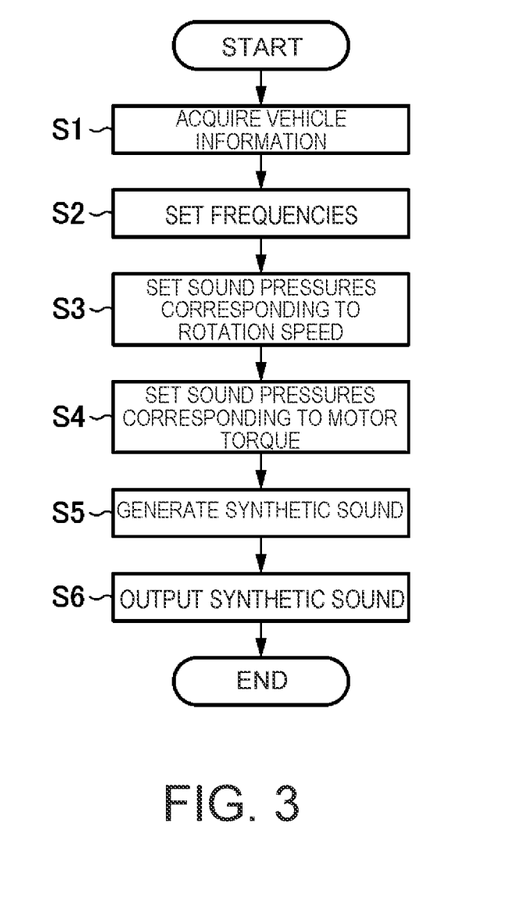
FIG. 3 is a flowchart of a sound generation process of the embodiment of the present invention.
Figure 4:
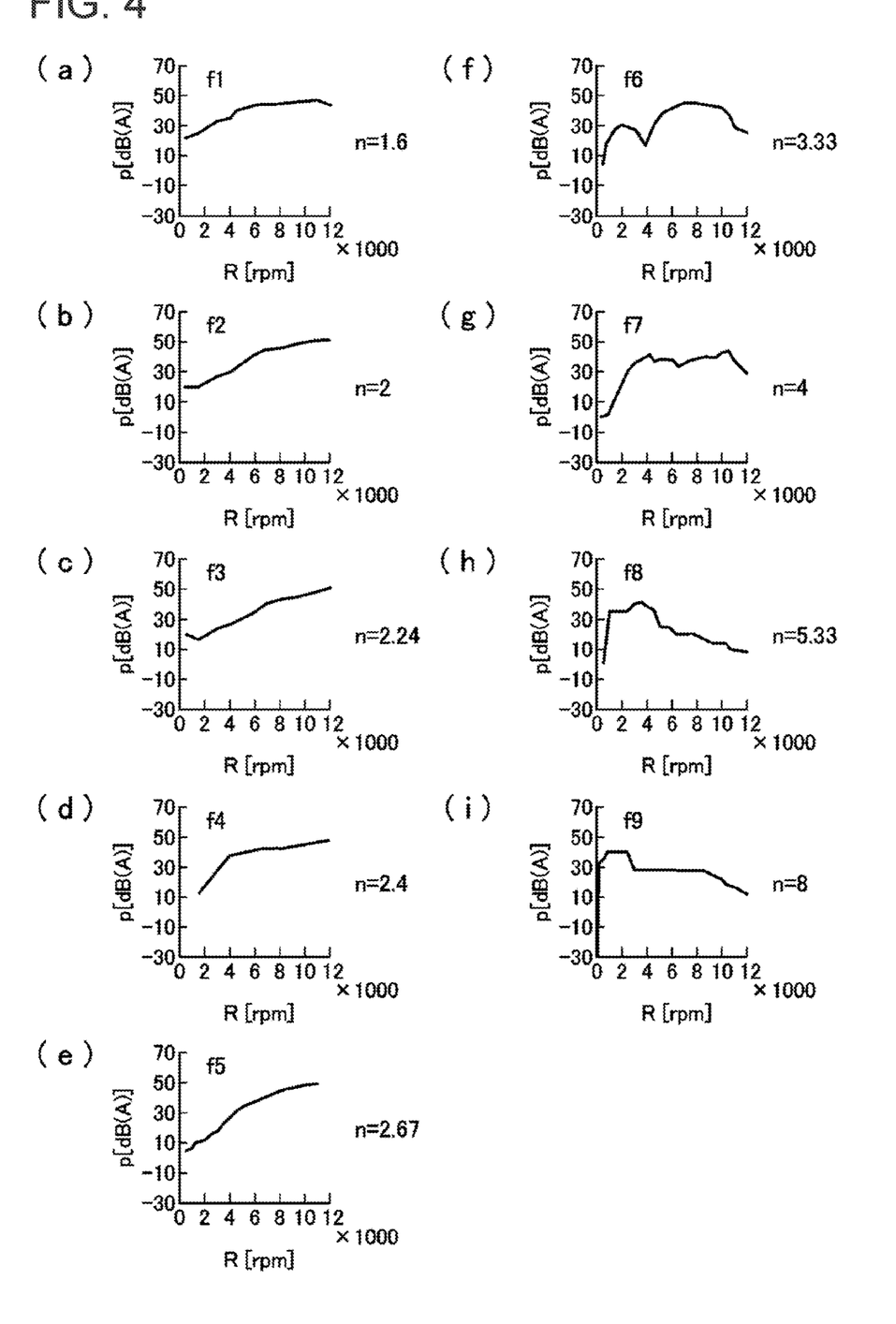
FIG. 4 is a first sound pressure setting map which represents the relationship between a motor rotation speed and a sound volume in the embodiment of the present invention.
Figure 5:
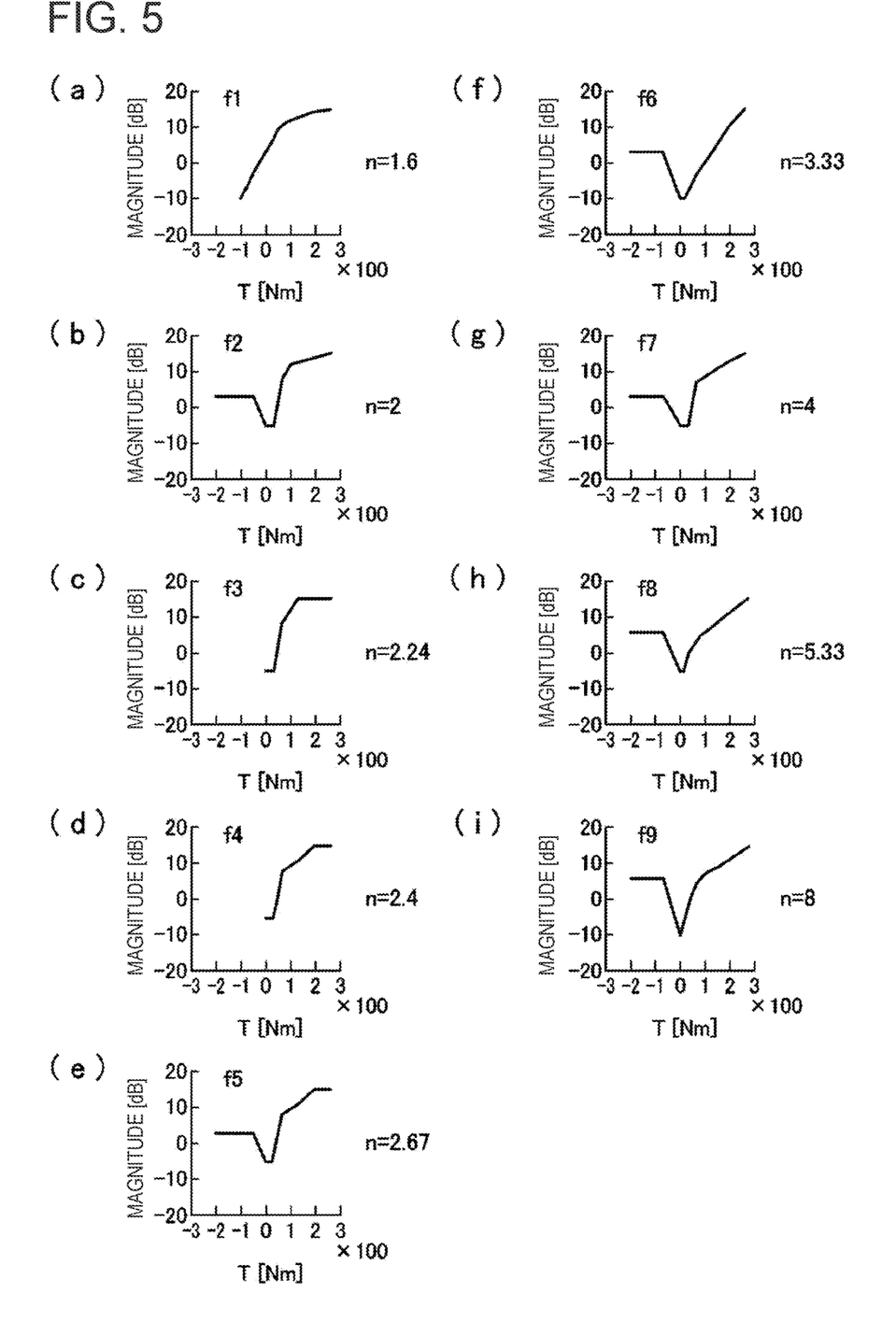
FIG. 5 is a second sound pressure setting map which represents the relationship between a motor torque value and an increase amount of the sound volume in the embodiment of the present invention.

Next, a description will be made about a sound generation process of the sound generation device for a vehicle of the present embodiment with reference to FIG. 3 to FIG. 5. FIG. 3 is a flowchart of the sound generation process, FIG. 4 is a first sound pressure setting map which represents the relationship between the motor rotation speed and a sound volume, and FIG. 5 is a second sound pressure setting map which represents the relationship between the motor torque value and an increase amount of the sound volume.

In the sound generation process, the sound generation device 1 for a vehicle is configured to generate a synthetic sound (artificial motor working sound) of sounds at a plurality of frequencies based on the detected vehicle information and to output this synthetic sound to the driver from the speaker 20. The sound generation device 1 for a vehicle repeatedly executes the sound generation process illustrated in FIG. 3 in each predetermined time period (for example, in each 10 ms).

First, in the sound generation process, the sound control apparatus 10 acquires the vehicle information via the in-vehicle communication line (step S1). As described above, the sound control apparatus 10 (the motor rotation speed detection unit 11 and the motor torque detection unit 12) acquires at least the motor rotation speed R and the motor torque value T.

Next, the sound control apparatus 10 (controller 13) performs a frequency setting process (step S2). In the frequency setting process, plural and a predetermined number of frequencies are set based on the motor rotation speed R. Specifically, nine frequencies f1 to f9 with respect to the motor rotation speed R as a first order frequency (fundamental frequency) are set by the following formula.

$$fk(Hz)=R(Hz)\times nk \qquad \text{(Formula 1)}$$

Here, k=1 to 9, and nk denotes an order with respect to the motor rotation speed R. Specifically, for example, n1 is 1.6, n2 is 2, n3 is 2.24, n4 is 2.4, n5 is 2.67, n6 is 3.33, n7 is 4, n8 is 5.33, and n9 is 8. For example, the 1.6th order frequency f1 is a frequency 1.6 times the motor rotation speed R (R(Hz)×1.6). Note that in the present embodiment, the fundamental frequency is set as the motor rotation speed R; however, the fundamental frequency is not limited to this but may be a frequency in a relationship where the frequency increases in accordance with an increase in the motor rotation speed R (for example, a proportional relationship).

For example, in a case where the motor rotation speed R is 50 Hz (3,000 rpm), the frequency f1 is 80 Hz, the frequency f2 is 100 Hz, the frequency f3 is 112 Hz, the frequency f4 is 120 Hz, the frequency f5 is 133 Hz, the frequency f6 is 167 Hz, the frequency f7 is 200 Hz, the frequency f8 is 267 Hz, and the frequency f9 is 400 Hz.

Next, the sound control apparatus 10 (controller 13) sets a sound pressure level of each of the frequencies based on the first sound pressure setting map (hereinafter also referred to as "map M1") stored in the storage unit 14 (step S3). As illustrated in FIG. 4, the map M1 is set for each of the frequencies f1 to f9 of the nine orders n1 to n9. In the map M1, a sound pressure level p (dB(A)) of each of sounds S1 to S9 at the frequencies f1 to P9 is defined with respect to the motor rotation speed R (rpm).

In the map M1 about low order frequencies (for example, the frequencies f1 to f5), the sound pressure level p generally increases in accordance with an increase in the motor rotation speed R. Meanwhile, in the map M1 about high order frequencies (for example, the frequencies f8 and f9), the sound pressure level p generally lowers in accordance with an increase in the motor rotation speed R. Note that in the present embodiment, the driver can hardly recognize a sound at a sound pressure level lower than 40 dB(A) but can recognize a sound at a sound pressure level of 40 dB(A) as a standard (audible sound pressure level). Consequently, in the map M1, for example, as for the frequency f9, because the sound pressure level p is set to less than 30 dB(A) at a motor rotation speed R of about 3,000 rpm or higher, in a high speed rotation condition, the driver cannot hear the sound S9 at the frequency f9. Thus, the driver cannot consciously hear frequency sounds at approximately 30 dB(A) which are included in a synthetic sound SC. However, a vehicle operation by the driver can unconsciously be influenced by such a frequency sound at approximately 30 dB(A).

Next, the sound control apparatus 10 (controller 13) further sets or corrects the sound pressure level of each of the frequencies f1 to f9 set from the map M1 based on the second sound pressure setting map (also referred to as "map M2") stored in the storage unit 14 (step S4). As illustrated in FIG. 5, the map M2 is set for each of the frequencies f1 to f9 of the orders n1 to n9. In the map M2, a correction amount or a correction gain (dB) for the sound pressure level at each of the frequencies f1 to f9 is defined with respect to the motor torque value T (Nm). Note that in the map M2, a positive motor torque indicates that the electric-powered motor 3 works in a powering state, and a negative motor torque indicates that the electric-powered motor 3 works in a regeneration state.

In the map M2, at each of the frequencies f1 to f9, the correction amount (correction gain) generally increases in accordance with an increase in a positive motor torque value. However, in the map M2, correction amounts for positive motor torque values are generally set larger for the low order frequencies (for example, the frequencies f1 to f5) than the high order frequencies (for example, the frequencies f6 to f9). For example, in a case where the motor torque value T is 100 (Nm), the correction amounts are 10 dB or more at the low order frequencies, but the correction amounts are less than 10 dB at the high order frequencies. Similarly, in a case where the motor torque value T is 200 (N·m), the correction amounts are about 15 dB at the low order frequencies, but the correction amounts are approximately 10 to 13 dB at the high order frequencies. Consequently, in the present embodiment, when the sound pressure level is set based on the motor rotation speed R and an acceleration request (accelerator operation) by the driver is made, the synthetic sound SC is generated which is corrected such that a sound Sk in a low tone range is reinforced more than a sound Sk in a high tone range. That is, in acceleration, a powerful synthetic sound SC is generated whose low sound side is boosted or emphasized.

In addition, the map M2 is set such that at the frequencies f2 to f8, even when the motor torque value T increases from zero, the correction gain does not increase until an increase amount of the motor torque value T exceeds a predetermined amount. Meanwhile, the map M2 is set such that at the frequencies f1 and f9, when the motor torque value T increases from zero, without waiting for an increase by the predetermined amount, the correction gain increases almost proportionally to an increase amount of the motor torque value T. Consequently, when the driver accelerates the vehicle 2 by an accelerator operation, the sound S1 at the lowest frequency f1 is output while being necessarily emphasized. That is, in acceleration, a rise of at least the sound Sk (k=1) in the lowest tone range is early, and the sound Sk (k=2 to 8) in a higher tone ranges thereafter follow.

Next, the sound control apparatus 10 (controller 13) generates and outputs a synthetic sound signal $S_S$ in which the sound S1 to S9 at the frequencies f1 to f9 are synthesized together (step S5). Amplitudes of sinusoidal signals having respective unit amplitudes of the frequencies f1 to f9 are adjusted such that set sound pressure levels are provided, adjusted sinusoidal signals are synthesized together, and the synthetic sound signal $S_S$ is thereby generated.

Then, the speaker 20 receives the synthetic sound signal $S_S$, performs an amplification process, and outputs the synthetic sound signal $S_S$ as the synthetic sound SC toward the driver (step S6). Consequently, the output synthetic sound SC is the sum of the sounds S1 to S9 at the frequencies f1 to f9.

$$SC=S1+S2+S3+S4+S5+S6+S7+S8+S9 \quad \text{(Formula 2)}$$

Figure 6:
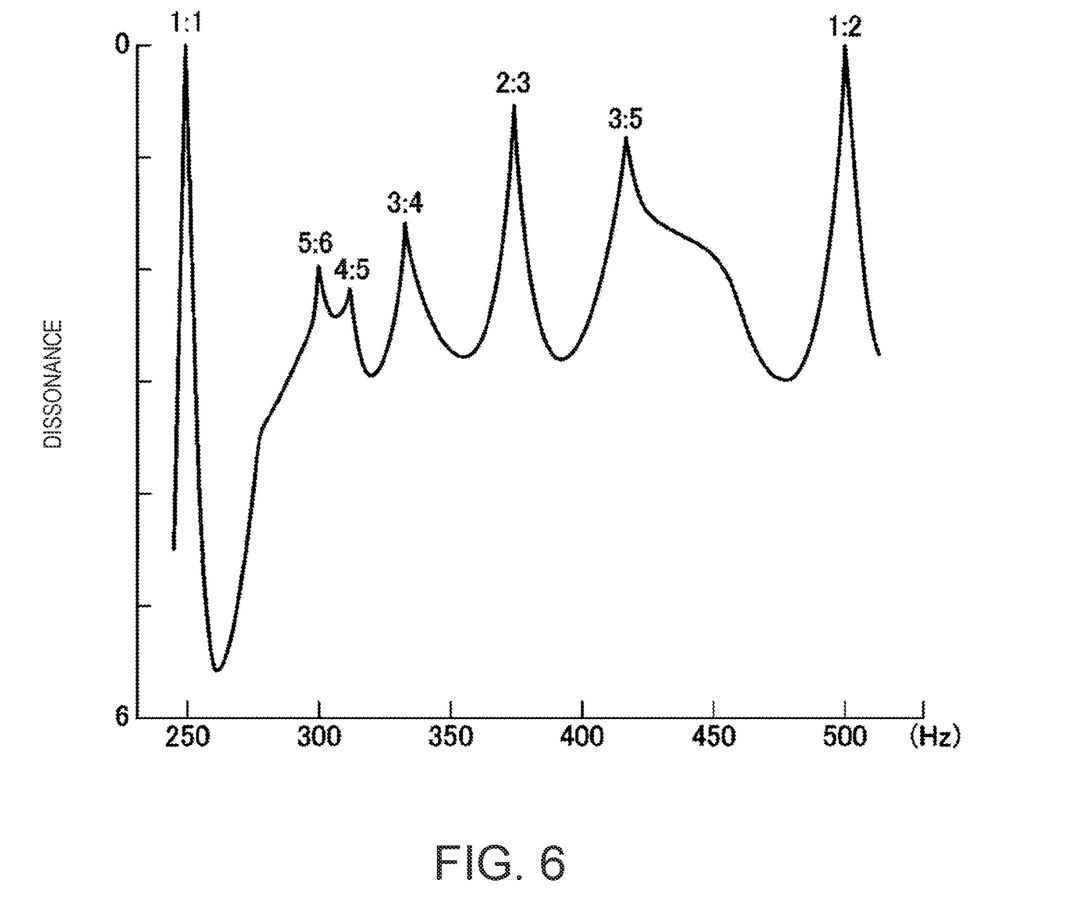
FIG. 6 is a known graph illustrating a dissonance degree between sounds at two frequencies (fundamental frequency and another frequency).

Next, mutual relationships among nth order frequencies will be described with reference to FIG. 6. FIG. 6 is a known graph illustrating a dissonance degree between sounds at two frequencies (fundamental frequency and another frequency). A low degree of dissonance between sounds at two frequencies indicates a high degree of concordance between sounds at two frequencies.

FIG. 6 illustrates the dissonance degree between sounds at two frequencies (one is a fundamental frequency of 250 Hz) on the basis of the structure of a human ear at grades of 0 to 6. A dissonance degree 0 (zero) denotes a state where two sounds are consonant. A dissonance degree 6 denotes a state where two sounds are not consonant. As the consonance degree is higher, a human feels a synthetic sound of two sounds to be comfortable. Conversely, as the consonance degree is lower, a human feels discomfort with a synthetic sound of two sounds.

In a case where two sounds are in a relationship of forming a chord, the consonance degree is relatively high. As states where the consonance degree between two sounds is high, two states of a perfect consonant interval and an imperfect consonant interval are present. Perfect consonant intervals include a perfect unison (the frequency ratio between two sounds being 1:1), a perfect octave (a frequency ratio of 1:2), a perfect fifth (a frequency ratio of 2:3), and a perfect fourth (a frequency ratio of 3:4), for example. In a perfect consonant interval, two sounds are harmonized, and their synthetic sound comfortably sounds to a human ear. Further, imperfect consonant intervals include a major sixth (a frequency ratio of 3:5), a major third (a frequency ratio of 4:5), a minor third (a frequency ratio of 5:6), and a minor sixth (a frequency ratio of 5:8), for example. In an imperfect consonant interval, a synthetic sound of two sounds comparatively comfortably sounds to a human ear although not as comfortable as a perfect consonant interval.

In the present embodiment, among the nine frequencies, the eight frequencies except the frequency f3 are in chord relationships (perfect consonant intervals or imperfect consonant intervals) with any of the other frequencies (however, no perfect unison). When chords are limited to the chords raised as the examples, the frequency f1 as chord relationships with three frequencies among the other eight frequencies. Similarly, the frequency f2 has chord relationships with five frequencies, the frequency f4 has chord relationships with three frequencies, the frequency f5 has chord relationships with five frequencies, the frequency f6 has chord relationships with four frequencies, the frequency f7 has chord relationships with six frequencies, the frequency f8 has chord relationships with three frequencies, and the frequency has chord relationships with two frequencies.

Meanwhile, in the present embodiment, the frequency f3 has no chord relationship with the other eight frequencies. That is, as illustrated in FIG. 6, a frequency band with a low consonance degree, whose dissonance degree is three or more, is present between 250 Hz and 300 Hz. The frequency f3 is selected so as to be included in the frequency band with such a low consonance degree with respect to the other eight frequencies.

Note that each combination of the frequency f2 and frequency f7, the frequency f5 and frequency f8, and the frequency f7 and frequency f9 forms a perfect octave (a frequency ratio of 1:2). Each combination of the frequency f1 and frequency f4, the frequency f5 and frequency f7, and the frequency f8 and frequency f9 forms a perfect fifth (a frequency ratio of 2:3). Each combination of the frequency f2 and frequency f5 and of the frequency f7 and frequency f8 forms a perfect fourth (a frequency ratio of 3:4).

Further, each combination of the frequency f1 and frequency f5, the frequency f2 and frequency f6, and the frequency f4 and frequency f7 forms a major sixth (a frequency ratio of 3:5). Each combination of the frequency f1 and frequency f2 and of the frequency f5 and frequency f6 forms a major third (a frequency ratio of 4:5). Each combination of the frequency f2 and frequency f4 and of the frequency f6 and frequency f7 forms a minor third (5:6). A combination of the frequency f6 and frequency f8 forms a minor sixth (5:8).

Figure 7A:
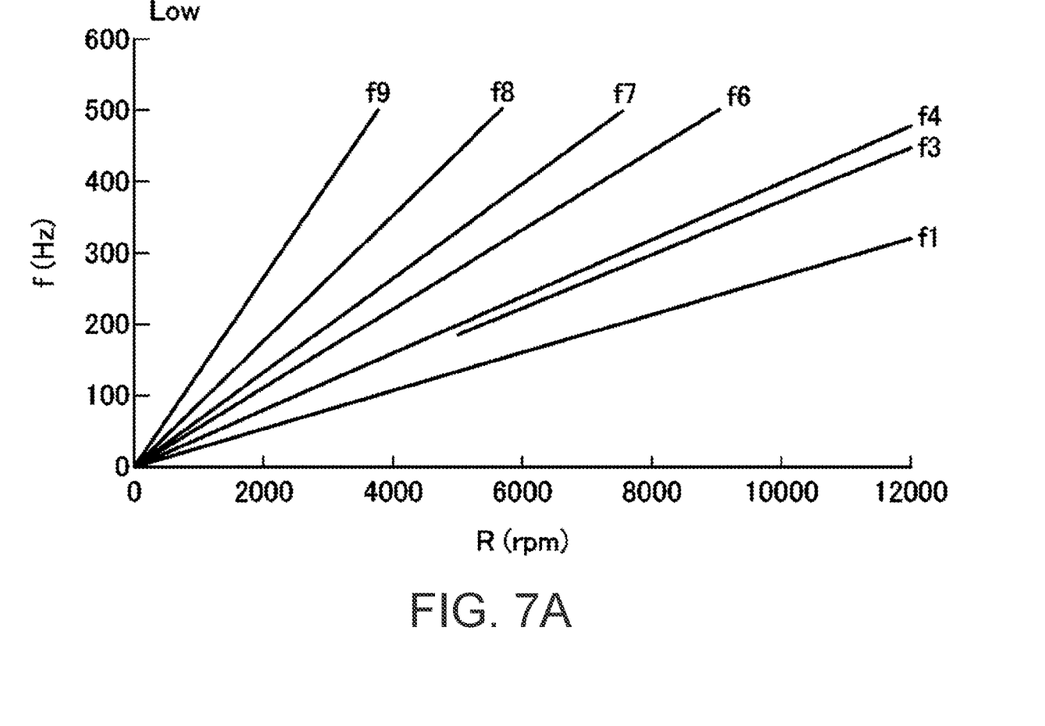
FIG. 7A is an explanatory diagram illustrating the relationship between the motor rotation speed and each frequency of a synthetic sound in a low motor torque condition in the sound generation device for a vehicle of the embodiment of the present invention.
Figure 7B:
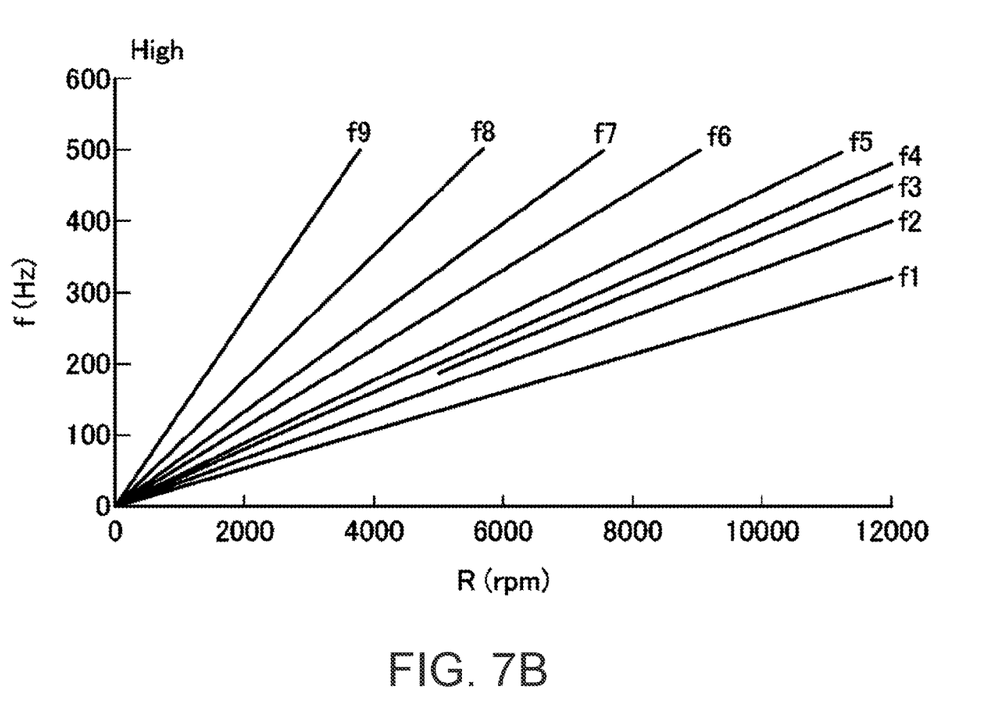
FIG. 7B is an explanatory diagram illustrating the relationship between the motor rotation speed and each frequency of the synthetic sound in a high motor torque condition in the sound generation device for a vehicle of the embodiment of the present invention.

Next, a description will be made about outline characteristics of the synthetic sound output by the sound generation device 1 for a vehicle with reference to FIG. 7A and FIG. 7B. FIG. 7A is an explanatory diagram illustrating the relationship between the motor rotation speed and each of the frequencies of the synthetic sound in a low motor torque condition. FIG. 7B is an explanatory diagram illustrating the relationship between the motor rotation speed and each of the frequencies of the synthetic sound in a high motor torque condition.

Referring to FIG. 7A and FIG. 7B, a range of the motor rotation speed R in which each of the sound S1 to S9 at the frequencies f1 to f9 is output at the audible sound pressure level can be understood (for example, in FIG. 7A, the highest sound S9 is output at the audible sound pressure level at the motor rotation speed R of 0 to 3.750 (rpm)). An audible sound pressure level means a range of a sound volume or a sound pressure, in which when a certain sound is output, a human ear is capable of hearing the sound. Note that FIG. 7A and FIG. 7B are simplified for easy understanding of characteristics of the synthetic sound SC of the present embodiment. Thus, FIG. 7A and FIG. 7B do not necessarily accurately reflect generation ranges of the sounds S1 to S9 (ranges of the motor rotation speeds R), the generation ranges being provided by using the above-described map M1 and map M2.

Referring to FIG. 7A and FIG. 7B, the electric-powered motor 3 ideally works at 0 to 12,000 (rpm). In this case, the frequencies f1 to f9 are proportional to the motor rotation speed R. As illustrated in FIG. 7A and FIG. 7B, the sound S3 at the frequency f3 at the audible sound pressure level is not included in the synthetic sound SC in a low rotation region and an intermediate rotation region (less than about 5,000 (rpm) in the present embodiment), but the sound S3 at the audible sound pressure level is included in the synthetic sound SC in a high rotation region (about 5,000 (rpm) or more).

As described above, the frequency f3 and the other frequencies are not in chord relationships but in dissonance relationships instead. Consequently, when the synthetic sound SC includes the sound S3 at the frequency f3, the sound S3 causes a beat with another sound Sk (for example, the sound S2). Accordingly, the synthetic sound SC changes into a sound with discomfort for the driver. The driver can recognize that the motor rotation speed R is in the high rotation region by such a change in sound quality. Note that because an output torque of the electric-powered motor 3 lowers in the high rotation region, the driver needs a larger accelerator operation amount than the low rotation region in order to obtain desired acceleration.

For such a configuration, in the map M1 about the frequency f3, the sound pressure level p is set to 30 dB(A) or more at the motor rotation speed R of 5,000 (rpm), which is a predetermined rotation speed threshold value, or more. In addition, in the map M2 about the frequency f3, a correction gain of +10 dB or more is set for the motor torque value of 70 (Nm), which is a generally intermediate motor torque value, or more. Accordingly, in the present embodiment, in usual traveling of the vehicle 2, the synthetic sound SC does not include the sound S3 at a recognizable sound pressure level; however, when the vehicle 2 works in the high rotation region in acceleration, the synthetic sound SC preferably includes the sound S3 at a recognizable sound pressure level.

Further, in the present embodiment, the frequency 2 is one of the frequencies at the lowest consonance degrees with the frequency f3. Furthermore, the map M1 about the frequency f3 is similar to the map M1 about the frequency f2, and the map M2 about the frequency f3 is similar to the map M2 about the frequency f2 in a range of positive motor torque values. Accordingly, in the present embodiment, a setting is made such that the sound S3 at the frequency f3 is output at an almost same sound pressure level as the sound S2 at the frequency f2. Consequently, in the present embodiment, the beat produced by the sound S2 and the sound S3 as a combination at a low consonance degree is further emphasized.

Further, as the motor rotation speed R becomes higher, the frequencies f6 to f9 on a high frequency side exceed a predetermined frequency threshold value (500 Hz in the present embodiment). However, the sound Sk exceeding 500 Hz sounds harsh to an ear. Consequently, in the present embodiment, as illustrated in FIG. 7A and FIG. 7B, when the frequencies f6 to f9 exceed 500 Hz, the sound pressure levels of the sounds S6 to S9 at those frequencies f6 to f9 are reduced. That is, the sound Sk at the frequency exceeding 500 Hz is preferably reduced to a sound pressure level of the audible sound pressure level or less.

For such a configuration, in the map M1 about the frequencies f6 to f9, in a rotation region where the frequencies f6 to f9 exceed 500 Hz, the sound pressure levels p is gradually reduced in accordance with frequency increases, or the sound pressure levels p are set to reduced values (for example, less than 30 dB(A)). Further, in the map M2 about the frequencies f6 to f9, particularly in low motor torque values, the correction gains are restricted to negative values or small positive values. Accordingly, in the present embodiment, a configuration is made such that when the frequency fk of the sound Sk exceeds a predetermined frequency threshold value, the sound Sk (k=6 to 9) is preferably reduced to a sound pressure level of the audible sound pressure level or less.

Note that as the motor rotation speed R increases, the sounds S9, S8, S7, S6, and S5 become inaudible to a human ear in this order. However, in a situation where the whole synthetic sound SC gradually changes from a sound in a low tone range to a sound in a high tone range, for example, even when the sound S9 as the highest sound becomes inaudible, a human ear feels, due to an illusion, as if the synthetic sound SC were changing to a high tone range. This phenomenon is caused by application of a phenomenon which is in general known as a Shepard tone. Consequently, even when the sound S9 to the sound S5 become inaudible in order, as the motor rotation speed R increases, a human ear feels as if the whole synthetic sound SC were changing to higher scales.

Further, when a depression amount of the accelerator by the driver is comparatively small and the motor torque value T is low (that is, a low torque condition, for example, 0<T<100), as illustrated in FIG. 7A, the sounds Sk at the seven frequencies except the frequencies f2 and f5 can be generated at the audible sound pressure level. Meanwhile, when the motor torque value T is high (that is, a high torque condition, for example, 200<T), as illustrated in FIG. 7B, the sounds Sk at all of the frequencies f1 to f9 can be generated at the audible sound pressure level.

Consequently, in the present embodiment, in a high torque condition, the driver feels that the sounds S2 and S5 are added to a low frequency side of a frequency range (a range of f1 to f9) of the synthetic sound SC. That is, in the present embodiment, in a low torque condition, three sounds S1, S3, and S4 are recognizable on a low frequency side. Meanwhile, in a high torque condition, five sounds S1 to S5 are recognizable on a low frequency side, and in the synthetic sound SC, sounds in a low tone range are emphasized more than sounds in a high tone range. Accordingly, to a human ear, the synthetic sound SC sounds more powerful in a high torque condition than a low torque condition.

Further, when hearing a sound including plural frequencies, a human ear feels that a sound at the frequency corresponding to the difference between two different frequencies is heard in addition to the sound at each of the frequencies. In a high torque condition, due to addition of the frequencies f2 and f5, the number of frequencies present in a certain frequency range increases (that is, a frequency density becomes high). Thus, in a high torque condition, a human ear feels as if a frequency of a lower sound other than the frequencies f2 and f5 were also added. In a high torque condition, this effect is also useful for causing the driver to feel that the synthetic sound SC is a powerful sound.

For such a configuration, in the map M1 about the frequencies f2 and f5, the sound pressure levels are set relatively lower than the map M1 about the other frequencies. Further, in the map M2 about the frequencies f2 and f5, the correction gains are set high in a range where the motor torque value T is high. Accordingly, in the present embodiment, a configuration is made such that the sounds S2 and S5 are restricted to sound pressure levels of the audible sound pressure level or less in a low torque condition but are output at sound pressure levels of the audible sound pressure level or more in a high torque condition.

Further, in the map M1, the sound S9 at the frequency f9 is set to 40 dB(A) in a range where the motor rotation speed R is about 1,000 to 3,000 (rpm) but is set to 30 dB(A) or less as the audible sound pressure level or less in other rotation speed ranges. However, in the map M2, the correction gain is added (for example, +10 dB at 200 (N•m)) at a high motor torque value T. Thus, when the driver deeply depresses the accelerator for quick acceleration, the sound S9 at a an audible sound pressure level can be included in the synthetic sound SC even when the motor rotation speed R is 3,000 (rpm) or more.

Next, a description will be made about operation of the sound generation device 1 for a vehicle of the present embodiment.

The sound generation device 1 for a vehicle of the present embodiment is installed in the vehicle 2 which travels using the electric-powered motor 3 as a power source and includes the sound control apparatus 10 (sound controller) which sets the plurality of frequencies f1 to f9 corresponding to the motor rotation speed R of the electric-powered motor 3 and generates the synthetic sound signal $S_S$ indicating the synthetic sound SC including the sounds S1 to S9 at the plurality of frequencies f1 to f9 and the speaker 20 (sound output unit) which outputs the synthetic sound SC based on the synthetic sound signal $S_S$ generated by the sound control apparatus 10, and the sound control apparatus 10 sets an increase amount of an output of a sound in a low frequency band (for example, a range of the frequencies f1 to f5) large compared to an increase amount of an output of a sound in a high frequency band (for example, a range of the frequencies f6 to f9) in the frequency range (a range of the frequencies f1 to f9) of the synthetic sound SC in accordance with an increase in the motor torque value T of the electric-powered motor 3.

In the present embodiment, the correction gains at positive motor torque values T are set relatively higher in the map M2 about the low frequency band than the map M2 about the high frequency band. Accordingly, when the driver performs an accelerator operation for accelerating the vehicle 2, increase amounts of the sound pressure levels of the sounds S1 to S5 in a low tone range of the synthetic sound SC become larger than the sounds S6 to S9 in a high tone range. Thus, in the present embodiment, when the driver depresses the accelerator, as its feedback, the synthetic sound SC whose low sound side is reinforced is output from the speaker 20. Furthermore, the synthetic sound SC whose low sound side is reinforced enables the driver to easily recognize powerfulness of acceleration of the vehicle 2 which corresponds to an accelerator operation, and an accurate accelerator operation by the driver is promoted.

Further, in the present embodiment, the sound control apparatus 10 makes an increase amount of an output of a sound at the at least one specific frequency (for example, the frequencies f1 to f5) included in the low frequency band (for example, the range of the frequencies f1 to f5) larger than an increase amount of an output of a sound included in the high frequency band (for example, the frequencies f6 to f9) in accordance with an increase in the motor torque value T of the electric-powered motor 3.

In this configuration, in the present embodiment, because in the frequency range of the synthetic sound SC, the sound at the at least one specific frequency in a relatively low frequency band is increased more largely than the sounds S6 to S9 in a relatively high frequency band, a sound in a low tone range of the synthetic sound SC can be reinforced.

Further, in the present embodiment, the output of the sound at the at least one specific frequency (for example, the frequencies f2 and f5) is increased from an output level which is unrecognizable by the driver in the vehicle 2 to an output level which is recognizable by the driver in accordance with an increase in the motor torque value T of the electric-powered motor 3.

In this configuration, in the present embodiment, taking into consideration an audible sound pressure level of a human, a sound at a new frequency is substantially added to the low frequency band in accordance with an increase in the motor torque value. Thus, in the present embodiment, because a sound pressure level in the low frequency band is increased and a sound whose frequency density in the low frequency band is made higher is generated, a sound in a low tone range of the synthetic sound SC can be reinforced.

Further, in the present embodiment, the at least one specific frequency (for example, the frequency f1, f2, f4, or f5) has a chord relationship with at least one other frequency among the plural frequencies.

In this configuration, in the present embodiment, the synthetic sound SC which is output when the motor torque value T is increased has a comparatively high consonance degree and sounds as a plurality of harmonious sounds (chord) to a human ear. Accordingly, the driver can receive a synthetic sound with little discomfort as feedback in an accelerator operation.

Further, in the present embodiment, the sound control apparatus 10 sets each of the frequencies f1 to f9 of the plurality of frequencies such that each of the frequencies is proportional to the motor rotation speed R of the electric-powered motor 3, and in a case where any frequency (for example, the frequencies f5 to f9) among the plurality of frequencies exceeds a predetermined frequency threshold value (for example, 500 Hz), the sound control apparatus 10 reduces an output of a sound at the frequency which exceeds the predetermined frequency threshold value.

In the present embodiment, the frequencies f1 to f9 of the sounds configuring the synthetic sound SC increase in accordance with an increase in the motor rotation speed R, and the driver can thereby recognize acceleration of the vehicle, but a sound at an excessively high frequency sounds harsh to a human ear. Accordingly, in the present embodiment, the output of the sound at the frequency which exceeds the predetermined frequency threshold value is reduced. That is, as the motor rotation speed R is increased, from the highest frequency f9 to the low frequency f5, the outputs of the sounds S9, S8, S7, S6, and S5 at specific frequencies are reduced in order. In this case, although the output of the sound at the highest frequency is reduced in accordance with an increase in the motor rotation speed R, similarly to an illusion due to the Shepard tone, it sounds to the ear of the driver as if all of the frequencies of the synthetic sound SC continued to increase. Thus, in the present embodiment, without hearing a harsh high frequency sound, the driver can recognize acceleration of the vehicle by a frequency increase which is felt by the ear as the motor rotation speed increases.

Further, in the present embodiment, the plurality of frequencies f1 to f9 include at least one dissonant frequency f3, the dissonant frequency f3 has a dissonance relationship with the other frequencies of the plurality of frequencies f1 to f9, and the sound control apparatus 10 increases an output of the sound S3 at the dissonant frequency f3 when the motor rotation speed R of the electric-powered motor 3 exceeds a predetermined rotation speed threshold value (for example, 5,000 (rpm)).

In this configuration, in the present embodiment, the sound S3 at the dissonant frequency f3 has a dissonance relationship with the sounds Sk at the other frequencies of the synthetic sound SC. Thus, when the output of the sound S3 at the dissonant frequency f3 is increased, a beat between this sound S3 and another sound Sk becomes large. In this case, the driver can perceive discomfort with the synthetic sound SC (for example, the synthetic sound SC is not harmonic) by presence of the beat. Thus, by this discomfort, the driver can recognize that the vehicle 2 is traveling in a higher motor rotation region than the predetermined rotation speed threshold value. In general, in an electric vehicle, the motor torque becomes low in a high rotation region where the motor rotation speed is high. Thus, by a change in the sound quality (beat) of the synthetic sound SC, the driver can easily recognize that a larger depression amount of the accelerator is needed to obtain further acceleration of the vehicle 2.

REFERENCE CHARACTER LIST 1 sound generation device for vehicle
2 vehicle
3 electric-powered motor
10 control apparatus
11 motor rotation speed detection unit
12 motor torque detection unit
13 controller
14 memory
20 speaker
30 sensor group
31 motor rotation speed sensor
32 vehicle speed sensor
33 accelerator opening sensor
34 ECU
M1 first sound pressure setting map
M2 second sound pressure setting map

The invention claimed is:

1. A sound generation device, the sound generation device being installed in a vehicle which travels using an electric-powered motor as a power source, the sound generation device comprising:
   a processor configured to set a plurality of frequencies corresponding to a motor rotation speed of the electric-powered motor and generate a synthetic sound signal indicating a synthetic sound including sounds at the plurality of frequencies; and
   a speaker configured to output the synthetic sound based on the synthetic sound signal, wherein
   the processor sets an increase amount of an output of a sound in a low frequency band large compared to an increase amount of an output of a sound in a high frequency band in a frequency range of the synthetic sound in accordance with an increase in a motor torque value of the electric-powered motor; and
   responsive to determining that the motor torque value exceeds a predetermined value, the increase amount of the output of the sound in the low frequency band is decreased.

2. The sound generation device according to claim 1, wherein
   the processor makes an increase amount of an output of a sound at at least one specific frequency included in the low frequency band larger than an increase amount of an output of a sound at a frequency included in the high frequency band in accordance with an increase in the motor torque value of the electric-powered motor.

3. The sound generation device according to claim 2, wherein
   the output of the sound at the at least one specific frequency is increased from an output level which is below a normal human hearing level range in the vehicle to an output level which is within the normal human hearing level range in accordance with an increase in the motor torque value of the electric-powered motor.

4. The sound generation device according to claim 3, wherein
   the at least one specific frequency has a chord relationship with at least one other frequency among the plurality of frequencies.

5. The sound generation device according to claim 4, wherein
   the processor sets each frequency of the plurality of frequencies such that each frequency of the plurality of frequencies is proportional to the motor rotation speed of the electric-powered motor, and
   in a case where any frequency among the plurality of frequencies exceeds a predetermined frequency threshold value, the processor reduces an output of a sound at the frequency which exceeds the predetermined frequency threshold value.

6. The sound generation device according to claim 5, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

7. The sound generation device according to claim 4, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

8. The sound generation device according to claim 3, wherein
the processor sets each frequency of the plurality of frequencies such that each frequency of the plurality of frequencies is proportional to the motor rotation speed of the electric-powered motor, and
in a case where any frequency among the plurality of frequencies exceeds a predetermined frequency threshold value, the processor reduces an output of a sound at the frequency which exceeds the predetermined frequency threshold value.

9. The sound generation device according to claim 8, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

10. The sound generation device according to claim 3, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

11. The sound generation device according to claim 2, wherein
the at least one specific frequency has a chord relationship with at least one other frequency among the plurality of frequencies.

12. The sound generation device according to claim 11, wherein
the processor sets each frequency of the plurality of frequencies such that each frequency of the plurality of frequencies is proportional to the motor rotation speed of the electric-powered motor, and
in a case where any frequency among the plurality of frequencies exceeds a predetermined frequency threshold value, the processor reduces an output of a sound at the frequency which exceeds the predetermined frequency threshold value.

13. The sound generation device according to claim 12, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

14. The sound generation device according to claim 11, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

15. The sound generation device according to claim 2, wherein
the processor sets each frequency of the plurality of frequencies such that each frequency of the plurality of frequencies is proportional to the motor rotation speed of the electric-powered motor, and
in a case where any frequency among the plurality of frequencies exceeds a predetermined frequency threshold value, the processor reduces an output of a sound at the frequency which exceeds the predetermined frequency threshold value.

16. The sound generation device according to claim 15, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

17. The sound generation device according to claim 2, wherein
the plurality of frequencies include at least one dissonant frequency, the at least one dissonant frequency having a dissonance relationship with other frequencies of the plurality of frequencies, and
the processor increases an output of a sound at the at least one dissonant frequency when the motor rotation speed of the electric-powered motor exceeds a predetermined rotation speed threshold value.

18. The sound generation device according to claim 1, wherein
the processor sets each frequency of the plurality of frequencies such that each frequency of the plurality of frequencies is proportional to the motor rotation speed of the electric-powered motor, and
in a case where any frequency among the plurality of frequencies exceeds a predetermined frequency threshold value, the processor reduces an output of a sound at the frequency which exceeds the predetermined frequency threshold value.

19. The sound generation device according to claim 18, wherein the plurality of frequencies include at least one dissonant frequency, the at least one dissonant frequency having a dissonance relationship with other frequencies of the plurality of frequencies, and the processor increases an output of a sound at the at least one dissonant frequency when the motor rotation speed of the electric-powered motor exceeds a predetermined rotation speed threshold value.

20. The sound generation device according to claim 1, wherein the plurality of frequencies include at least one dissonant frequency, the at least one dissonant frequency having a dissonance relationship with other frequencies of the plurality of frequencies, and the processor increases an output of a sound at the at least one dissonant frequency when the motor rotation speed of the electric-powered motor exceeds a predetermined rotation speed threshold value.

* * * * *